United States Patent [19]
Jackson

[11] Patent Number: 5,649,736
[45] Date of Patent: Jul. 22, 1997

[54] AUTOMOBILE MOUNTABLE TRANSPARENT SUN VISOR SYSTEM

[76] Inventor: Keith Arnold Jackson, 3636 Agnes, Kansas City, Mo. 64128

[21] Appl. No.: 664,867

[22] Filed: Jun. 17, 1996

[51] Int. Cl.$^6$ ............................................. B60J 3/06
[52] U.S. Cl. ........................................ 296/97.2; 296/97.9
[58] Field of Search .................... 296/97.2, 97.9, 296/97.1, 97.12

[56] References Cited

U.S. PATENT DOCUMENTS

| | | | |
|---|---|---|---|
| 2,050,889 | 8/1936 | Klise | 296/97.2 |
| 2,456,484 | 12/1948 | Bell | 296/97.9 |
| 2,999,718 | 9/1961 | Handler | 296/97.9 |

*Primary Examiner*—Joseph D. Pape

[57] ABSTRACT

An automobile mountable transparent sun visor system, the system replacing the existing sun visors in an automobile, the system comprising: a shield comprised of transparent clear or colored plastic and formed in a planar configuration, the shield having an inner surface and an outer surface, with the inner surface of the exposed portion of the shield being covered with a tinted and or reflective material, the shield including a plurality of screw holes extending through its upper extent; and an inner support bar, the bar formed as a generally rectangular block and including a cylindrically shaped bore extending from the center of each end edge between about two and three inches into the bar, the bar including short screw holes located between its center point and each outer side edge, the screw holes perpendicularly intersecting the bore in the bar, the inner edge of the bar being affixed to the upper extent of the shield, the bar also including set screws coupled with respect to the short screw holes.

3 Claims, 7 Drawing Sheets

AUTOMOBILE MOUNTABLE TRANSPARENT SUN VISOR SYSTEM

BACKGROUND OF THE INVENTION

1. Field of the Invention

The present invention relates to automobile mountable transparent sun visor system and more particularly pertains to tilting the tinted transparent shield of the automobile mounted sun visors to reduce sun glare while maintaining visibility through the shield.

2. Description of the Prior Art

The use of automobile glare protection devices is known in the prior art. More specifically, automobile glare protection devices heretofore devised and utilized for the purpose of blocking sun glare in automobiles are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,040,840 to Kokeisl a glare protection device for motor vehicle passengers.

U.S. Pat. No. 4,978,159 to Landford discloses an automotive glare shield.

U.S. Pat. No. 4,890,875 to Takahashi discloses a sun visor for automobile.

U.S. Pat. No. 4,818,011 to Cherian discloses an anti-glare visor system.

Lastly, U.S. Pat. No. Des. 334,551 to Andres discloses a tinted automobile sun visor.

In this respect, the automobile mountable transparent sun visor system according to the present invention substantially depart from the conventional concepts and designs of the prior art, and in doing so provide an apparatus primarily developed for the purpose of tilting the tinted transparent shield of the automobile mounted sun visors to reduce sun glare while maintaining visibility through the shield.

Therefore, it can be appreciated that there exists a continuing need for new and improved automobile mountable transparent sun visor system which can be used for tilting the tinted transparent shield of the automobile mounted sun visors to reduce sun glare while maintaining visibility through the shield. In this regard, the present invention substantially fulfills this need.

SUMMARY OF THE INVENTION

In view of the foregoing disadvantages inherent in the known types of automobile glare protection devices now present in the prior art, the present invention provides improved automobile mountable transparent sun visor system. As such, the general purpose of the present invention, which will be described subsequently in greater detail, is to provide a new and improved automobile mountable transparent sun visor and method which has all the advantages of the prior art and none of the disadvantages.

To attain this, the present invention essentially comprises an automobile mountable transparent sun visor system, the system replacing the existing sun visors in an automobile, the system comprising, in combination: a plurality of shields, each shield being comprised of transparent clear or colored plastic and shaped in a planar generally rectangular configuration, each shield having an inner surface and an outer surface with a small thickness therebetween, with the inner surface of the exposed portion of each shield being covered with tinted or reflective contact paper of one of varying colors, each shield and its affixed contact paper including a buffed out hard wax protective coating, each shield having parallel long side edges and parallel short side edges, the short side edges being positioned vertically in the operative orientation, with the long side edges defining the upper extent and lower extent of the shield, each shield including three screw holes extending through its upper long side edge; a plurality of inner support bars of varying colors and materials, each bar formed as a generally rectangular block with a parallel top edge and bottom edge and parallel planar end edges, each bar also having an inner side edge and an outer side edge, each bar including a cylindrically shaped bore extending from the center of each end edge between about two and three inches into the bar, a dowel end plug formed in a rounded generally cylindrical configuration being positionable in one of the bores in the operative orientation, each bar including a screw hole in its outer side edge near each end edge, the screw holes perpendicularly intersecting with the bore in the bar, the inner side edge of the bar being affixed to the upper extent of the shield, with the top edge of the bar positioned flush with the upper long side edge of the inner surface of the shield, with the end edges of the bar positioned flush with the short side edges of the shield, the inner side edge of the bar including three screw holes extending approximately half way through its width with the holes being positioned above the bores in the inner support bar, the screw holes being positioned in alignment with the screw holes in the shield, the bar also including two set screws being couplable inside the screw holes in the outer side edge of the inner support bar; a plurality of outer support bars of varying colors and materials, each bar formed as a generally rectangular block with a parallel top edge and bottom edge and parallel planar end edges, each bar also having an inner side edge and an outer side edge, the inner side edge of each outer support bar being affixed to the upper extent of the outer surface of the shield, with the top edge of each outer support bar positioned flush with the upper long side edge of the shield, with the end edges of the bar positioned flush with the short side edges of the shield, each outer support bar including three screw holes in its outer side edge extending completely through to the inner side edge, the screw holes being positioned in alignment with the screw holes in the shield and inner side edge of the inner support bar, the bar also including three bolts set with holding glue and coupled inside the screw holes in the outer support bar; a first installation kit to be used in association with a standard automobile suspension arm and cooperatively coupled and mounted base, the suspension arm being formed as an elongated cylindrical member, the arm being positionable within a bore in the inner support bar, the arm being formed in an L shaped configuration and including coupling means affixed to its lowermost extent, the base being formed in a generally planar configuration and including an aperture with coupling means adapted to couple suspension arm, the base being affixed within an automobile, the first kit consisting of a plurality of differently sized, hollow generally cylindrically shaped insert tubes, each having an approximately centrally located region with a smaller diameter than the remainder of the tube, the tubes being positionable over a suspension arm, the inner support bar being couplable around a suspension bar mounted insert tube in the operative orientation; a second installation kit consisting of suspension arms, mounting blocks, bases, and cooperatively coupled screws and washers, all of the components fabricated of hard plastic in a wide variety of sizes and colors to match the associated visors, the suspension arm formed as a cylindrical tube and shaped in a generally L-shaped configuration with an inboard region, an outboard region and a central region therebetween, the inboard region having a smaller diameter than the remainder of the arm and including axially and radially positioned screw holes, the outboard region formed in a generally cylindrical configuration and being positionable within a bore of an inner support bar in an operative orientation, the central region being positioned between the inboard and outboard regions and having the same outer diameter as the outboard region, the area between the outboard and central regions having a smaller outer diameter than the adjacent regions to permit releasable coupling with the suspension arm, the bases being formed in a plurality of planar configurations each including a centrally positioned aperture and a plurality of small screw holes therearound, the second kit also including a plurality of different sized washers and screws to aid assembly, the components of the second installation kit being mountable to the interior of an automobile with an inner support bar positioned thereupon; and a third installation kit being adapted for use with installation kits one and two, the third kit consisting of a linear suspension arm, a plug and a face plate and cover, the components enabling the user to adapt vehicles with non-standard centrally positioned mounting blocks to utilize the automobile mountable transparent sun visor, the suspension arm being couplable to the center of a passenger cab with the bases and other components of the second installation kit, the face plate and cover being positionable over the hole left by the removal of a mounting block from the cab of an automobile, the plug being positionable in the free end of an inner support bar when utilizing the first or second installation kit.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

It is another object of the present invention to provide new and improved automobile mountable transparent sun visor system which may be easily and efficiently manufactured and marketed.

It is further object of the present invention to provide new and improved automobile mountable transparent sun visor system which are of durable and reliable constructions.

An even further object of the present invention is to provide new and improved automobile mountable transparent sun visor system which are susceptible of a low cost of manufacture with regard to both materials and labor, and which accordingly are then susceptible of low prices of sale to the consuming public, thereby making such automobile mountable transparent sun visor system economically available to the buying public.

Still yet another object of the present invention is to provide new and improved automobile mountable transparent sun visor system which provide in the apparatuses and methods of the prior art some of the advantages thereof, while simultaneously overcoming some of the disadvantages normally associated therewith.

Still another object of the present invention is to tilt the tinted and or reflective transparent shield of the automobile mounted sun visor to reduce sun glare while maintaining visibility through the shield.

Lastly, it is an object of the present invention to provide an automobile mountable transparent sun visor system, the system replacing the existing sun visors in an automobile, the system comprising: a shield comprised of transparent clear or colored plastic and formed in a planar configuration, the shield having an inner surface and an outer surface, with the inner surface of the exposed portion of the shield being covered with a tinted and or reflective material, the shield including a plurality of screw holes extending through its upper extent; and an inner support bar, the bar formed as a generally rectangular block and including a cylindrically shaped bore extending from the center of each end edge between about two and three inches into the bar, the bar including short screw holes located between its center point and each outer side edge, the screw holes perpendicularly intersecting the bore in the bar, the inner edge of the bar being affixed to the upper extent of the shield, the bar also including set screws coupled with respect to the short screw holes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
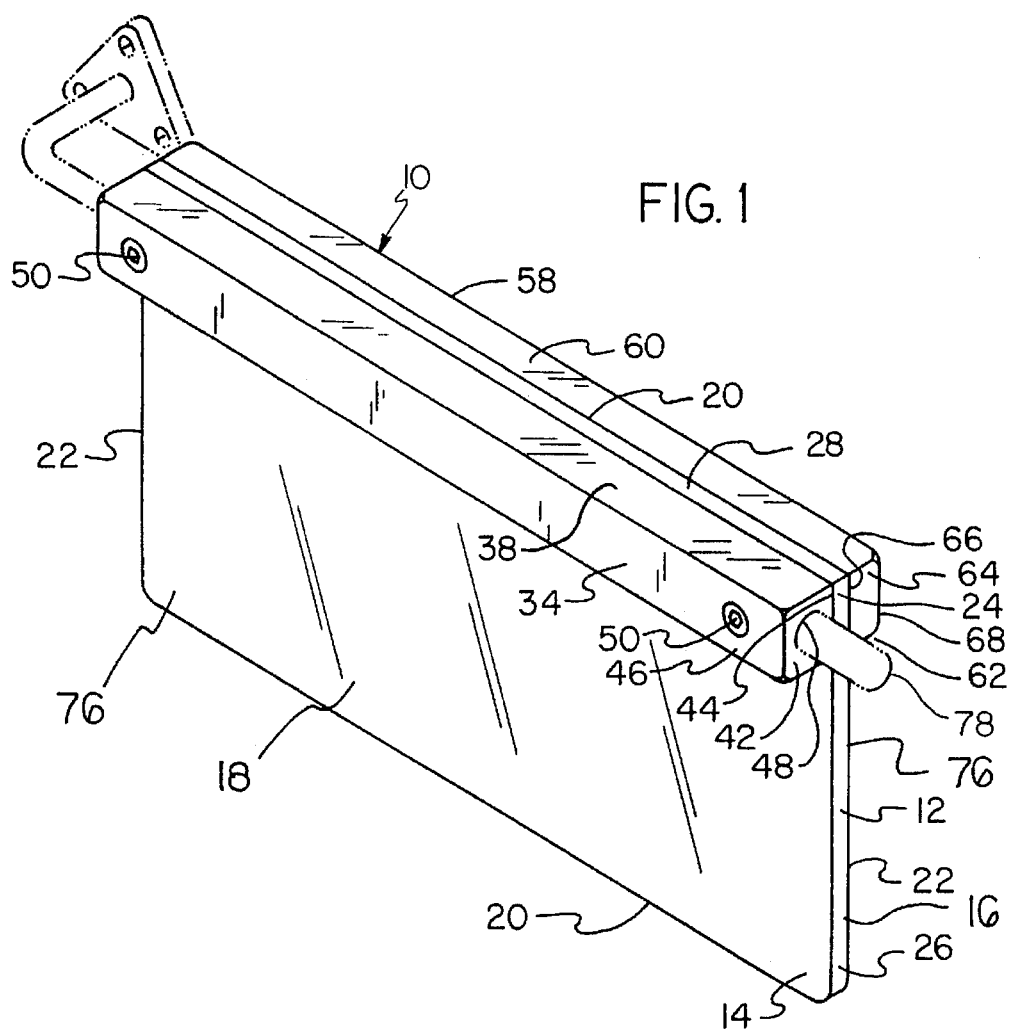
FIG. 1 is a perspective view of the preferred embodiment of the automobile mountable transparent sun visor constructed in accordance with the principles of the present invention.
Figure 2:
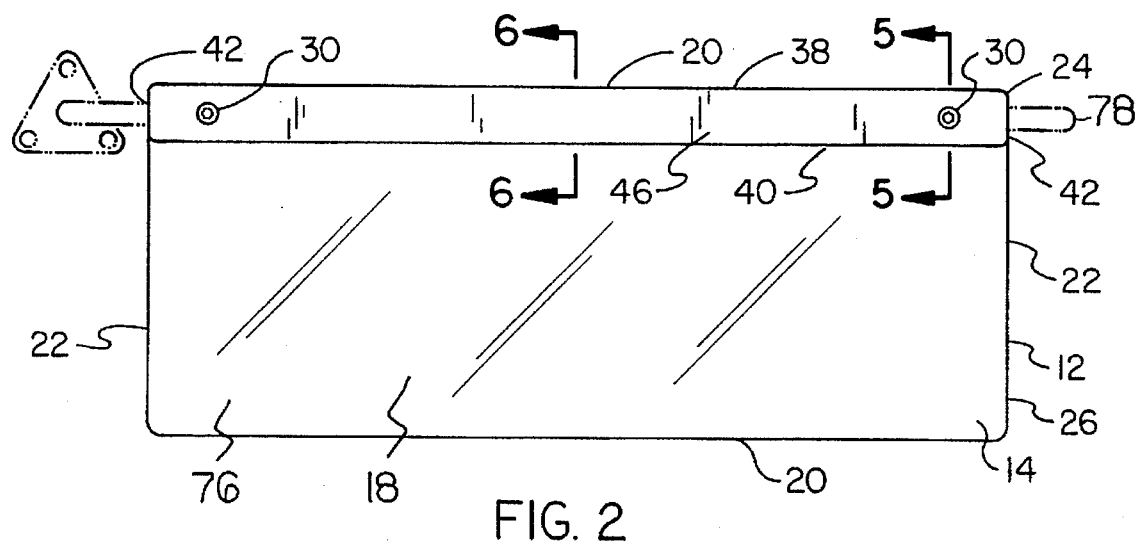
FIG. 2 is a front elevational view of the visor shown in FIG. 1.
Figure 3:
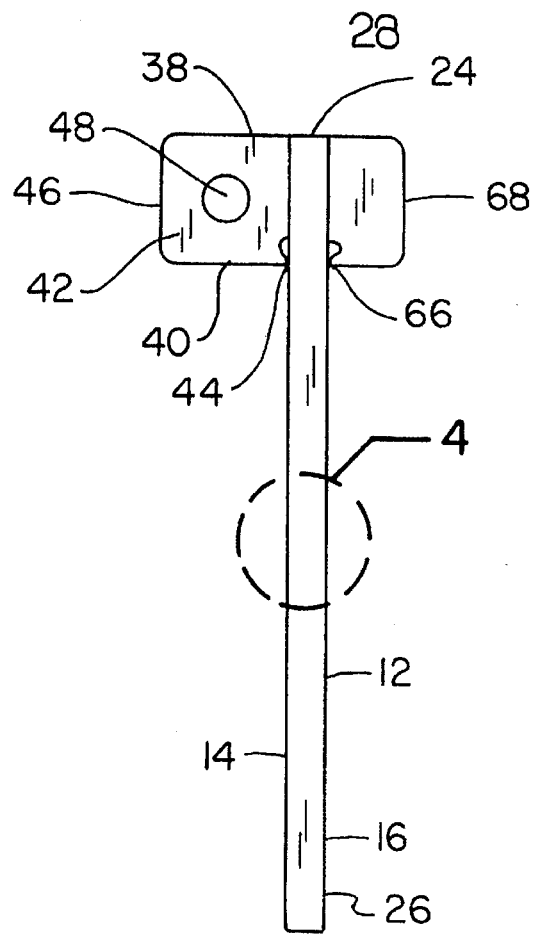
FIG. 3 is a side elevational view of the visor in a detached orientation.
Figure 4:
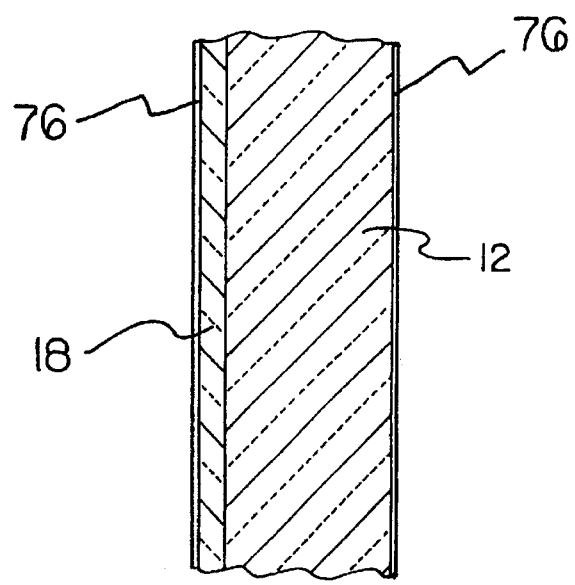
FIG. 4 is a broken away exploded perspective view of the shield component taken along line 4 of FIG. 3.
Figure 5:
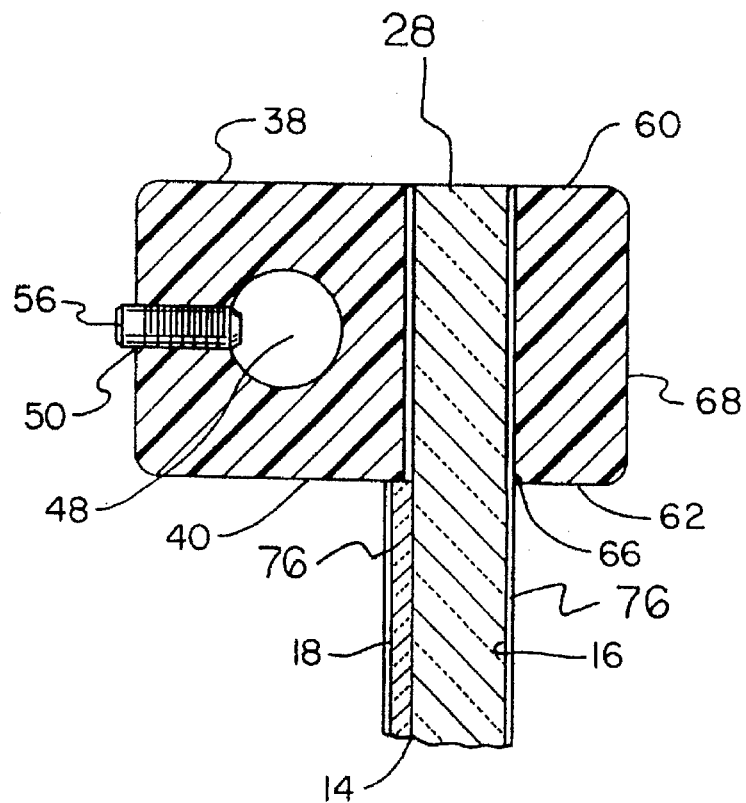
FIG. 5 is an exploded cross-sectional view of the visor taken along line 5—5 of FIG. 2.
Figure 6A:
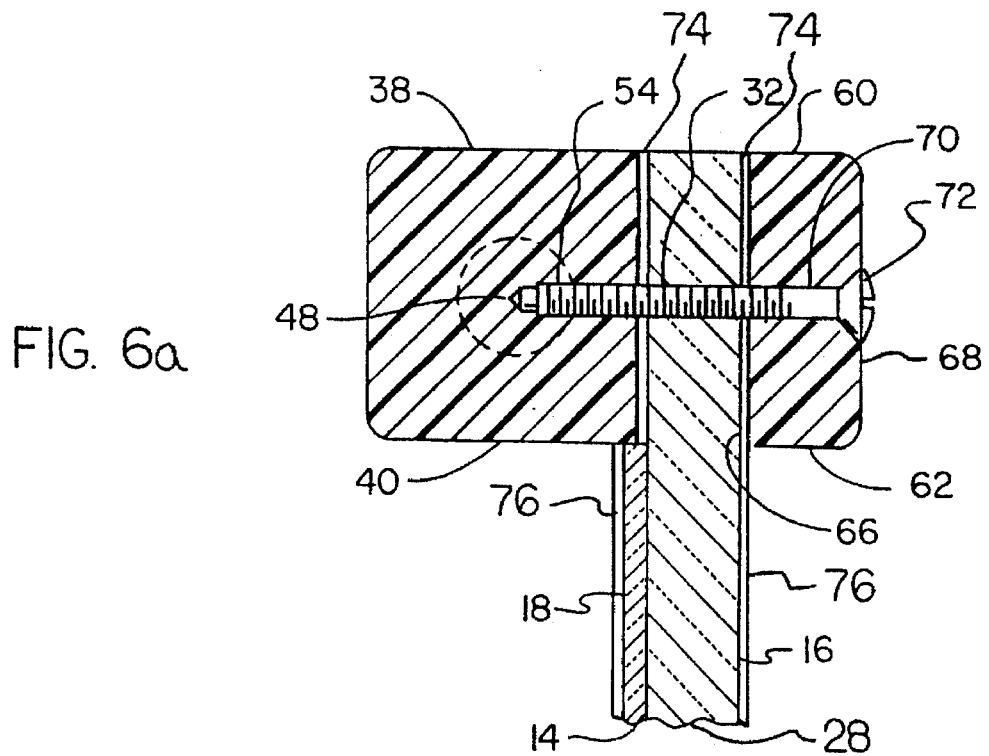
FIG. 6a is an exploded cross-sectional view of the visor taken along line 6—6 of FIG. 2.
Figure 6B:
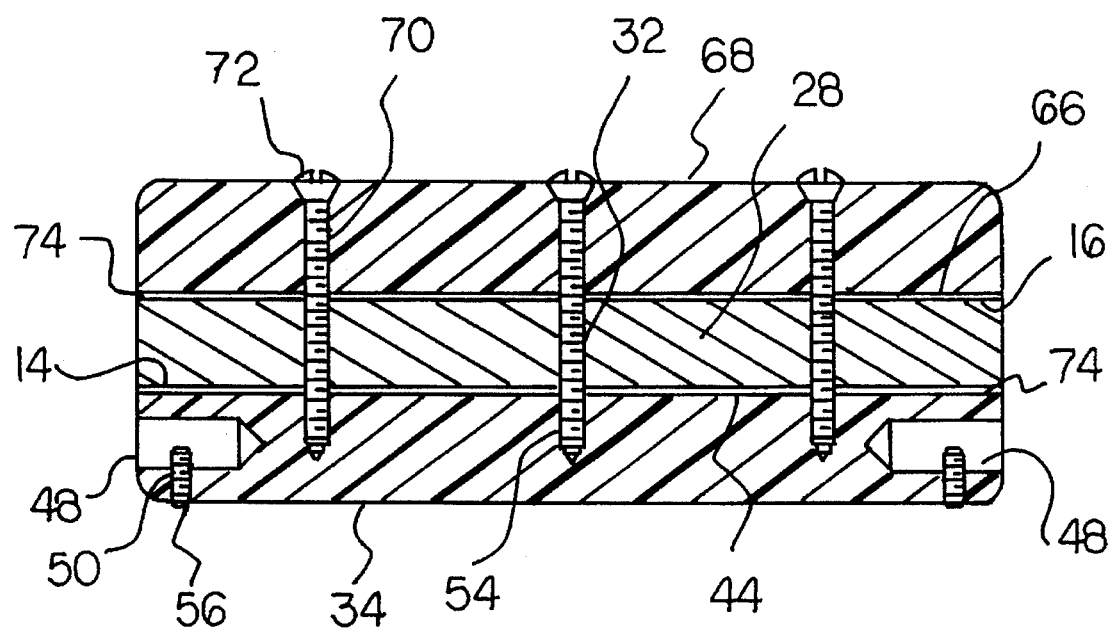
FIG. 6b is an top view of FIG. 6.
Figure 7A:
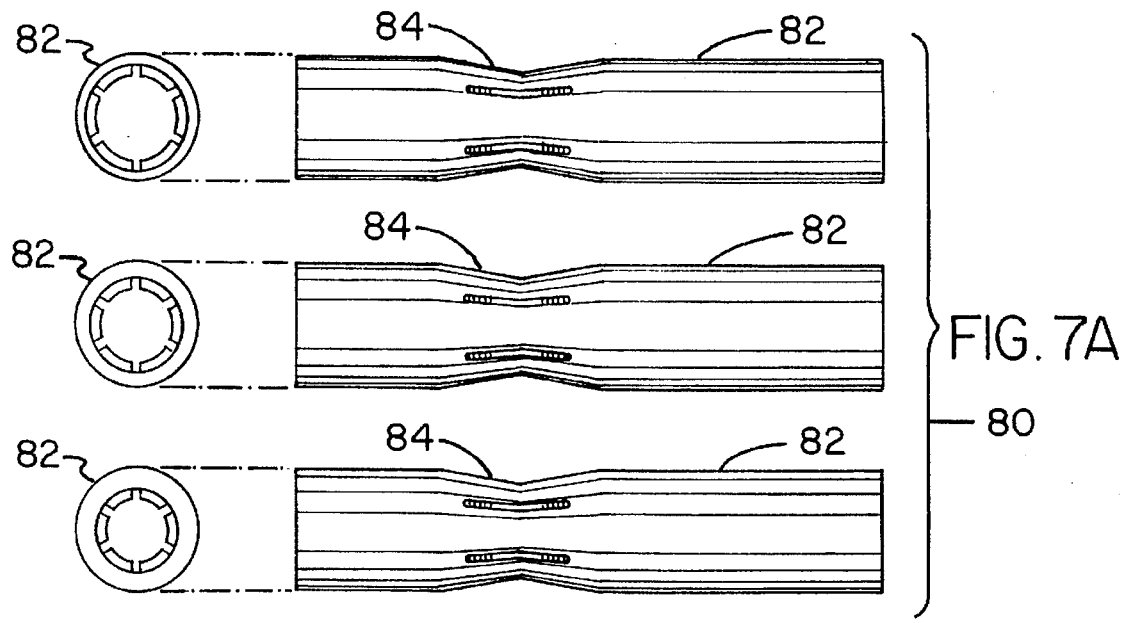
FIGS. 7a and 7b are perspective views of the first installation kit of the apparatus and its corresponding insert tube components.
Figure 7B:
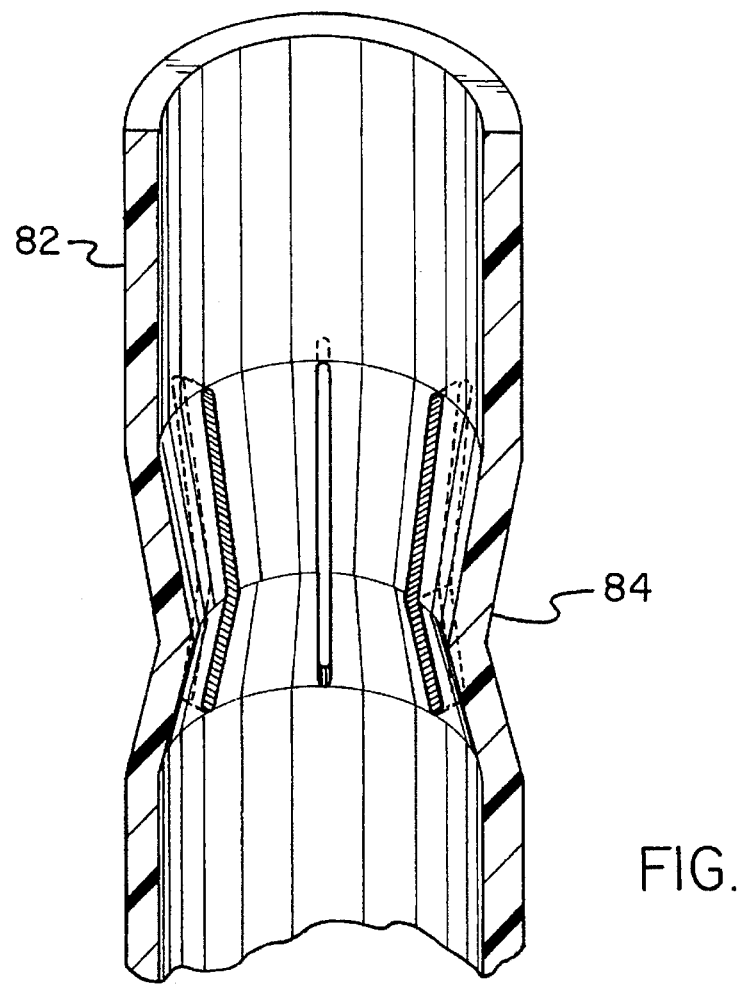
Figure 8:
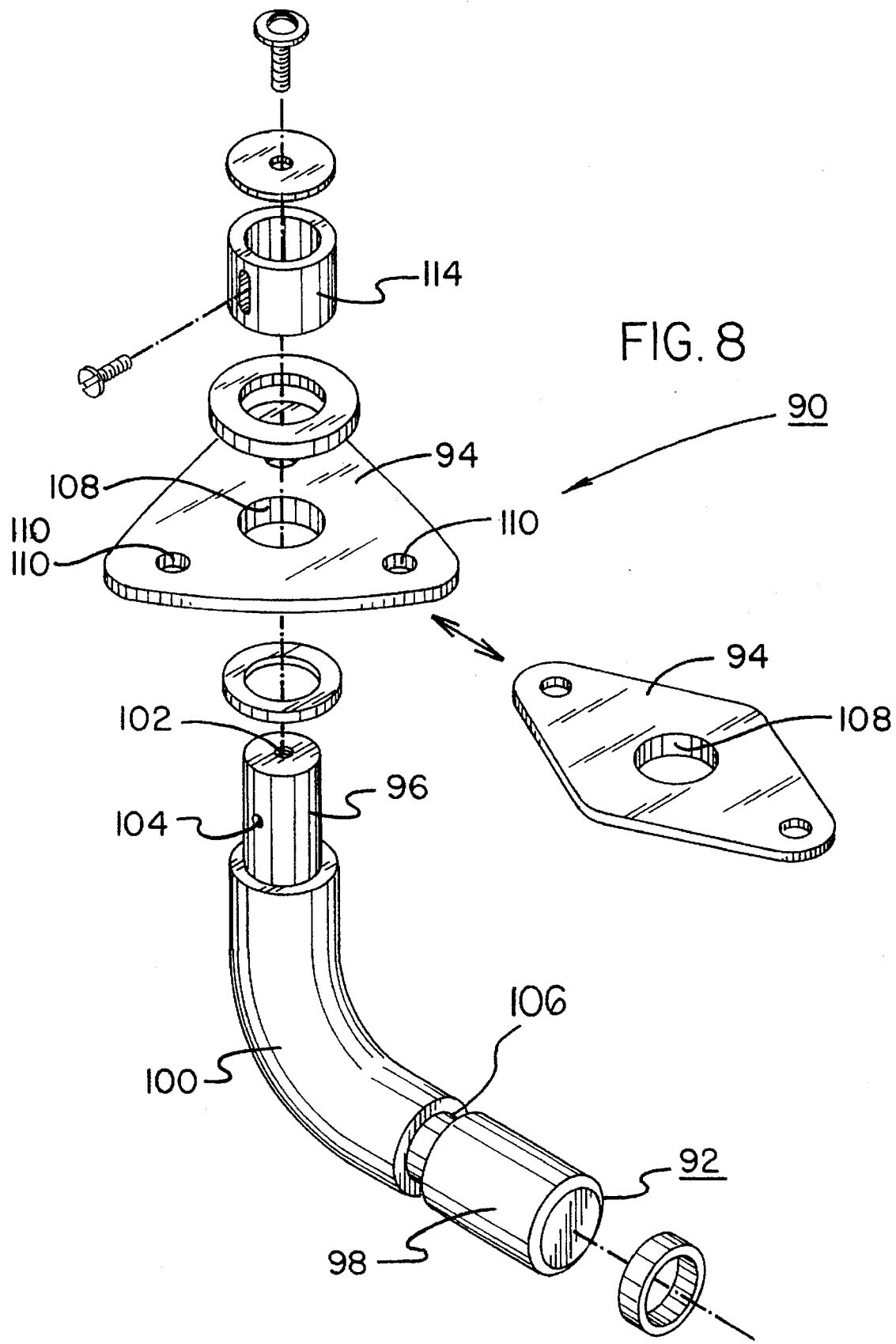
FIG. 8 is a perspective view of the second installation kit of the apparatus and its corresponding components.
Figure 9A:
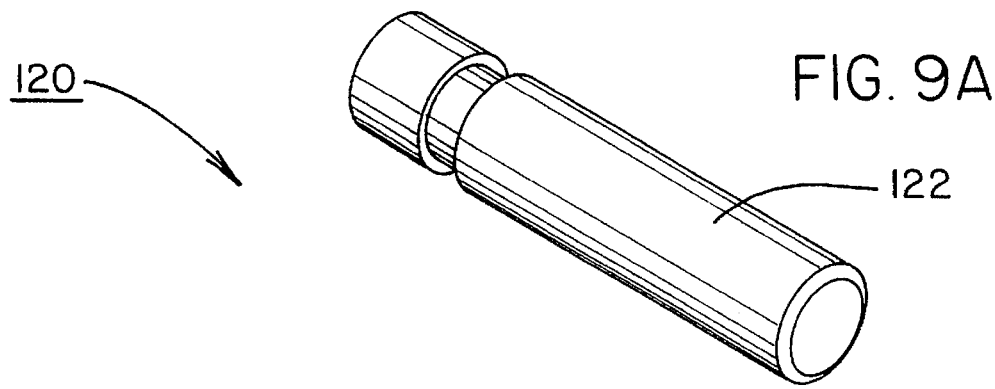
FIGS. 9a, 9b and 9c are perspective views of the third installation kit of the apparatus and its corresponding components.
Figure 9B:
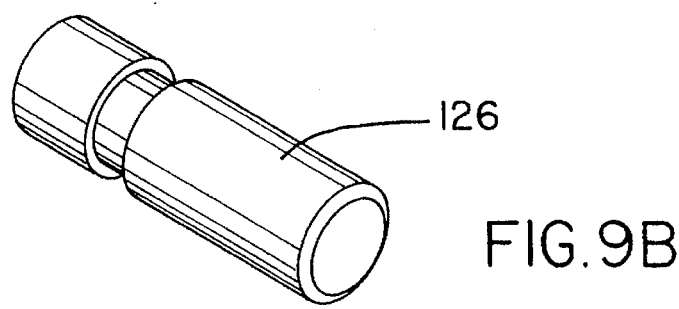
Figure 9C:
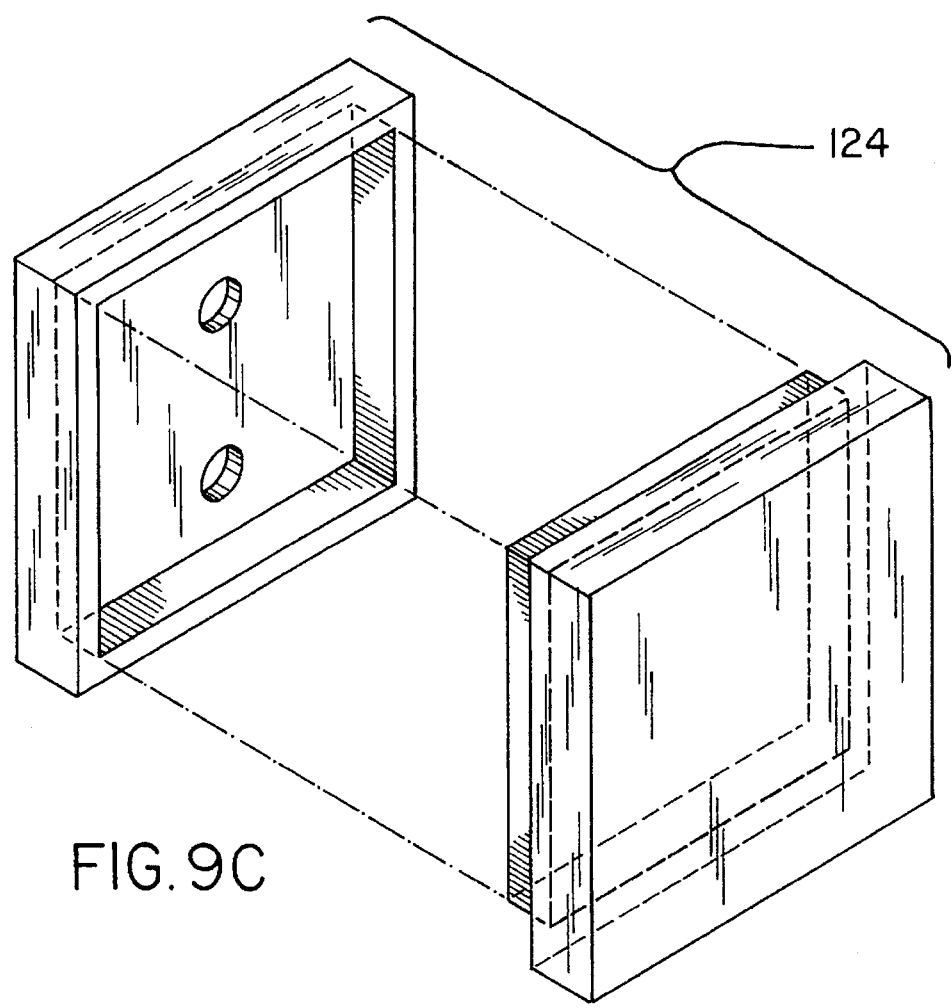

With reference now to the drawings, and in particular to FIG. 1 thereof, the preferred embodiment of the new and improved automobile mountable transparent sun visor system embodying the principles and concepts of the present invention and generally designated by the reference numeral 10 will be described.

Specifically, it will be noted in FIGS. 1 through 9, that there is provided a new and improved automobile mountable transparent sun visor. The automobile mountable transparent sun visor 10, in its broadest context, comprises a plurality of shields 12, a plurality of inner support bars 34, a plurality of outer support bars 58, a first installation kit 80, a second installation kit 90 and a third installation kit 120.

More specifically, the plurality of shields 12 is made of transparent clear or colored plastic and shaped in a planar generally rectangular configuration. Each shield 12 has an inner surface 14 and an outer surface 16 with a small thickness therebetween. The inner surface 14 of the exposed portion of each shield is covered with tinted or reflective contact paper 18 of one of varying colors. The material functions to reflect sun light and the bright lights of on coming vehicles. The contact paper is available in a wide array of colors to conform to the interior of any automobile. Each shield and its affixed contact paper includes a buffed-out hard wax protective coating 76. The wax coating protects the apparatus from scratching, dulling or hazing when being handled or cleaned. Each shield 12 has parallel long side edges 20 and parallel short side edges 22. The short side edges 22 are positioned vertically in the operative orientation, with the long side edges 20 defining the upper extent 24 and lower extent 26 of the shield. Each shield includes three screw holes 32 which extend through its upper long side edge. Note in particular FIGS. 1, 2, 5 and 6.

A plurality of inner support bars 34 of varying colors and materials are each formed as a generally rectangular block. Each block has a parallel top edge 38 and bottom edge 40, and parallel planar end edges 42. Each bar 34 also has an inner side edge 44 and an outer side edge 46. Each bar 34 also includes a cylindrically shaped bore 48 which extends from the center of each end edge between about two and three inches into the bar. A dowel end plug 78 is formed in a generally cylindrical configuration and is adapted to be positioned in one of the bores in the operative orientation. The end plug will fit in either one of the bores. If the rightly positioned bore is coupled to the vehicle, the end plug will be mounted in the leftwardly positioned bore, and vice versa. Each bar 34 includes a screw hole 50 in its outer side edge near each end edge 42. The screw holes 50 perpendicularly intersect the bores 48 in the bar. Note FIG. 5. The inner edge 44 of the bar is affixed to the upper extent 24 of the shield. The top side edge 38 of the bar is positioned flush with the upper long side edge 28 of the outer surface of the shield. The end edges 42 of the bar are positioned flush with the short side edges 22 of the shield. The inner side edge 44 includes three screw holes 54 which extend approximately half way through its width. Note FIG. 6. The screw holes 54 are positioned centered in the support bar 34 in front of the bores 48. One of the screw holes is centered in the middle of the support bar. The bar also includes two set screws 56 adapted to be coupled inside the screw holes 50 in the outer side edge 46 of the inner support bar 34. The aperture in the visor is adapted to fit on the visor support arms that are standard equipment in most vehicles. The set screws intersect the support arm within the aperture thereby holding the apparatus firmly in place. The visor may be mounted on the left or right support arm of the vehicle. Note FIGS. 1, 2 and 5.

A plurality of outer support bars 58 of varying colors and materials are each formed as a generally rectangular block.

Each block has a parallel top edge 60 and bottom edge 62, and parallel planar end edges 64. Each bar 58 also has an inner side edge 66 and an outer side edge 68. The inner edge 66 of each bar 58 is affixed to the upper extent of the inner surface 16 of the shield. The top side edge 60 of the bar is positioned flush with the upper long side edge 28 of the shield. The end edges 64 of the bar are positioned flush with the short side edges 22 of the shield. Each outer support bar 58 includes three screw holes 70 in the upper extent of its outer side edge 68 which extend completely through to the inner side edge 66. The screw holes are centered in the outer side edge 68. The screw holes 70 are positioned in alignment with the screw holes 32, 54 in the shield and inner side edge of the inner support bar. Holding glue 74 is applied along the length of the inner side of the inner bar and the length of the inner side of the outer bar. The screws are sufficiently long to extend through the outer support bar and shield, and about half way through the inner support bar. Note FIGS. 1, 3 and 6.

A first installation kit 80 is used in association with a standard automobile suspension arm and a cooperatively coupled and mounted base. The suspension arm is formed as an elongated cylindrical member. The arm is adapted to be positioned within a bore in the inner support bar. The lower extent of the arm is formed in an L-shaped configuration and includes coupling means affixed to its lowermost extent. Suspension arms of this configuration are standard equipment on most automobiles. The base is formed in a generally planar configuration and includes an aperture with coupling means adapted to couple the suspension arm. The base is affixed to the interior of an automobile. Suspension arms and bases of this configuration are standard equipment on most automobiles.

The first kit 80 requires the removal of a previously mounted visor. The first kit consists of a plurality of differently sized, hollow generally cylindrically shaped insert tubes. Each tube 82 has an approximately centrally located region 84 with a smaller diameter than the remainder of the tube. The tubes are adapted to be positioned over a suspension arm in the operative orientation. The inner support bar is adapted to be positioned around a mounted tube in the operative orientation with a set screw securing the two components firmly in place. Note FIGS. 7a and 7b.

A second installation kit 90 consists of suspension arms 92, bases 94, and cooperatively coupled screws and washers. All of the components are fabricated of hard plastic and in a wide variety of sizes and colors to match the associated visors. The second kit requires the removal of a previously mounted suspension arm and base. The arms and bases included in the second kit completely replace the former equipment.

The suspension arm 92 of the second kit is formed as a cylindrical tube and is shaped in a generally L-shaped configuration. The arm has an inboard region 96, an outboard region 98 and a central region therebetween 100. The inboard region has a smaller diameter than the remainder of the arm and includes axially 102 and radially 104 positioned screw holes. The outboard region is formed in a generally cylindrical configuration and is adapted to be positioned within a bore of the inner support arm in the operative orientation. The central region is positioned between the inboard and outboard regions and has the same outer diameter as the outboard region. The area between the outboard and central regions 106 has a smaller outer diameter than the adjacent regions to permit releasable coupling with the suspension arm. The suspension arm is contoured to fit tightly within a bore of the inner support bar with a set screw securing the arm tightly therein. Note FIG. 8.

The bases 94 are formed in a plurality of planar configurations with each including a centrally positioned aperture 108 and a plurality of small screw holes 110 therearound. The second kit also includes a plurality of different sized washers and screws to aid assembly and enhance durability of the apparatus. The suspension arm and base are adapted to be mounted to the interior of an automobile with the inner support bar of the apparatus positioned thereupon. The inboard region of the arm is positioned in the central aperture of the base in the operative orientation. Note FIG. 8.

The automobile mounted transparent sun visor is designed to replace the conventional sun visors in cars and trucks. The principal component of the apparatus is its tinted transparent shield. The shield contains a tinted reflective material on its outer surface. The shield reflects sun glare and the bright lights of oncoming vehicles while at the same allowing the user to see through the shield. In effect, the apparatus functions similar to sun glasses but without the inconvenience of having to wear them. The reflective properties of the shield permit a user to watch other people without that person being able to see through the shield and view the user.

The flexible design of the visor allows it to be manufactured inexpensively in a wide variety of colors. The support bars can be made of wood or plastic and in a wide array of colors to conform to any automobile interior. The reflective material on the shield component of the apparatus is also available in a wide array of colors. The transparent sun visor is adapted so that it may be hung on the right or left visor support arm in an automobile passenger compartment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An automobile mountable transparent sun visor system, the system replacing the existing sun visors in an automobile, the system comprising, in combination:

a plurality of shields, each shield being comprised of transparent clear or colored plastic and shaped in a planar generally rectangular configuration, each shield having an inner surface and an outer surface with a small thickness therebetween, with the inner surface of the exposed portion of each shield being covered with tinted or reflective contact paper of one of varying colors, each shield and its affixed contact paper including a buffed out hard wax protective coating, each shield having parallel long side edges and parallel short side edges, the short side edges being positioned vertically in the operative orientation, with the long side edges defining the upper extent and lower extent of the shield, each shield including three screw holes extending through its long side edge;

inner support bars each being formed as a generally rectangular block with a parallel top edge and bottom edge and parallel planar end edges, each bar also having an inner side edge and an outer side edge, each bar including a cylindrically shaped bore extending from the center of each end edge between about two and three inches into the bar, a dowel end plug formed in a rounded generally cylindrical configuration being positionable in one of the bores in the operative orientation, each bar including a screw hole in its outer side edge near each end edge, the screw holes perpendicularly intersecting with the bore in the bar, the inner side edge of the bar being affixed to the upper extent of the shield, with the top edge of the bar positioned flush with the upper long side edge of the inner surface of the shield, with the end edges of the bar positioned flush with the short side edges of the shield, the inner side edge of the bar including three screw holes extending approximately half way through its width with the holes being positioned centrally in front of the bores and center middle in the inner support bar, the screw holes being positioned centered in front of the bores and center middle in the inner support bar, the crew holes being positioned in alignment with the screw holes in the shield, the bar also including two set screws being couplable inside the screw holes in the outer side edge of the inner support bar;

outer support bars each being formed as a generally rectangular block with a parallel top edge and bottom edge and parallel planar end edges, each bar also having an inner side edge and an outer side edge, the inner side edge of each outer support bar being affixed to the upper extent of the outer surface of the shield, with the top edge of each outer support bar positioned flush with the upper long side edge of the shield, with the end edges of the bar positioned flush with the short side edges of the shield, each outer support bar including three screw holes in its outer side edge extending completely through to the inner side edge, the screw holes being positioned in alignment with the screw holes in the shield and inner side edge of the inner support bar, the bar also including three bolts set with holding glue and coupled inside the screw holes in the outer support bar, the inner sides of the inner and outer support bars being affixed to the inner and outer surface of the shield with holding glue;

a first installation kit adapted for use in association with a standard automobile suspension arm, the suspension arm including a cooperatively coupled mounted base, the suspension arm being formed as an elongated cylindrical member, the arm being positionable within a bore in the inner support bar, the arm being formed in an L shaped configuration and including coupling means affixed to its lowermost extent, the base being formed in a generally planar configuration and including an aperture, the base adapted to be coupled to the suspension arm, the base being affixed within an automobile, the first kit consisting of a plurality of differently sized, hollow generally cylindrically shaped insert tubes, each having an approximately centrally located region with a smaller diameter than the remainder of the tube, the tubes being positionable over a suspension arm, the inner support bar being couplable around the suspension bar mounted insert tube in the operative orientation;

a second installation kit consisting of suspension arms, mounting blocks, bases, and cooperatively coupled screws and washers, all of the components fabricated of hard plastic in a wide variety of sizes and colors to match the associated visors, the suspension arm formed as a cylindrical tube and shaped in a generally L-shaped configuration with an inboard region, an outboard region and a central region therebetween, the inboard region having a smaller diameter than the remainder of the arm and including axially and radially positioned screw holes, the outboard region formed in a generally cylindrical configuration and being positionable within a bore of an inner support bar in an operative orientation, the central region being positioned between the inboard and outboard regions and having the same outer diameter as the outboard region, the area between the outboard and central regions having a smaller outer diameter than the adjacent regions to permit releasable coupling with the suspension arm, the bases being formed in a plurality of planar configurations each including a centrally positioned aperture and a plurality of small screw holes therearound, the second kit also including a plurality of different sized washers and screws to aid assembly, the components of the second installation kit being mountable to the interior of an automobile with an inner support bar positioned thereupon.

2. An automobile mountable transparent sun visor system, the system replacing the existing sun visors in an automobile, the system comprising:

a shield comprised of transparent clear or colored plastic and formed in a planar configuration, the shield having an inner surface and an outer surface, with the inner surface of the exposed portion of the shield being covered with a tinted and or reflective material, the shield including a plurality of screw holes extending through its upper extent; and an inner support bar, the bar formed as a generally rectangular block and including a cylindrically shaped bore extending from the center of each end edge between about two and three inches into the bar, the bar including short screw holes located between its center point and each outer side edge, the screw holes perpendicularly intersecting the bore in the bar, the inner edge of the bar being affixed to the upper extent of the shield, the bar also including set screws coupled with respect to the short screw holes.

3. The automobile mountable transparent sun visor system as set forth in claim 2 and further including:

an outer support bar formed as a generally rectangular block including at least one long screw hole in its middle extent, the inner edge of each bar being affixed to the upper extent of the shield on the side thereof opposite the inner support bar.

* * * * *